United States Patent [19]

Harkness

[11] Patent Number: 4,895,119
[45] Date of Patent: Jan. 23, 1990

[54] SPEED GOVERNING APPARATUS

[75] Inventor: Joseph R. Harkness, Germantown, Wis.

[73] Assignee: Briggs & Stratton Corporation, Wauwatosa, Wis.

[21] Appl. No.: 194,322

[22] Filed: May 16, 1988

[51] Int. Cl.$^4$ ............................................. F02D 9/00
[52] U.S. Cl. .................................. 123/376; 123/364; 123/372
[58] Field of Search ............... 123/372, 373, 363, 364, 123/365, 376, 420, 90.17; 74/572

[56] References Cited

U.S. PATENT DOCUMENTS

| 2,887,099 | 5/1959 | Roosa | 123/372 |
| 2,938,510 | 5/1960 | Froggatt et al. | 123/373 |
| 3,841,111 | 10/1974 | Staudt et al. | 123/364 |
| 3,842,815 | 10/1974 | Bechstein et al. | 123/373 |
| 4,289,101 | 9/1981 | Knorreck | 123/364 |
| 4,362,139 | 12/1982 | Isobe et al. | 123/364 |
| 4,459,956 | 7/1984 | Roca-Nierga et al. | 123/372 |

FOREIGN PATENT DOCUMENTS

| 1241664 | 6/1967 | Fed. Rep. of Germany | 123/372 |
| 2022863 | 12/1979 | United Kingdom | 123/364 |
| 2063513 | 6/1981 | United Kingdom | 123/372 |

Primary Examiner—Willis R. Wolfe
Assistant Examiner—M. Macy
Attorney, Agent, or Firm—Andrus, Sceales, Starke & Sawall

[57] ABSTRACT

A speed governing apparatus for an internal combustion engine. A plurality of flyweights are pivoted to a flyweight carrier mounted on the cam shaft of the engine and a surface of each flyweight is engaged with the end of a spool that is mounted for rotation with the cam shaft, but can move axially thereof. A spring loaded non-rotatable fork straddles the cam shaft and is engaged with the opposite end of the spool. The fork is secured to a rod which, in turn, is operably connected to the throttle of the engine. The end of the spool, against which the fork rides, is an undulating cam surface which results in the continuous axial oscillation of the spool, and corresponding continuous radial oscillation of the flyweights relative to the spool, during operation of the engine. The radial oscillation of the flyweights relative to the spool reduces the frictional forces, so that under varying load conditions the spool can be more readily moved by the pivoting action of the flyweights to provide more precise speed control.

12 Claims, 2 Drawing Sheets

SPEED GOVERNING APPARATUS

BACKGROUND OF THE INVENTION

Speed governors are frequently utilized with small commercial or industrial engines to maintain a substantially constant engine speed during varying load conditions. One common type of system is associated with the cam shaft of the engine and consists of a plurality of flyweights carried by a flyweight carrier mounted on the cam shaft. The flyweights are pivoted to the carrier in a manner such that centrifugal force acts to move the flyweights away from the axis of the cam shaft. Each flyweight includes an abutment or finger, which bears against the end of a spool that is mounted coaxially with the cam shaft. The spool is secured to the shaft in a manner such that it rotates with the shaft, but can slide axially with respect to the shaft.

Axial movement of the spool under the action of the flyweights is resisted by a fork which straddles the cam shaft and is spring biased into engagement with the opposite end of the spool. The fork is secured to a rotatable rod or shaft which is operably connected to the throttle of the engine. With this arrangement, the biasing force of the spring acts in opposition to the centrifugal force on the flyweights to thereby maintain the engine speed relatively constant regardless of the load on the engine.

With the governing system as described above, the flyweights and spool both rotate with the cam shaft, so that there is no relative rotation between the members. However, as the engine speed changes, the flyweights tend to move radially relative to the spool as the centrifugal force exceeds the force of the biasing spring. This relative radial motion of the fly-weights, small as it is, is resisted by frictional forces. The spool does not move, therefore, until the difference between the centrifugal force and the biasing spring force exceeds the frictional forces.

It is desirable to reduce the frictional forces that resist movement of the flyweights and the spool, because they add and substract from the centrifugal force, depending on whether the flyweights are moving radially in or out. These frictional forces cause the governing system both to "hunt" up and down in speed and to hold an erratic speed.

SUMMARY OF THE INVENTION

The invention is directed to a speed governing apparatus which substantially reduce the affects of friction in the system, thereby providing more precise speed control and minimizing "hunting".

In accordance with the invention, a plurality of flyweights are pivotally connected to a gear or flyweight carrier mounted on the cam shaft of the engine and each flyweight includes an abutment or finger which is engaged with the face of a flange on the spool that is mounted coaxially of the cam shaft. The spool is connected to the cam shaft in a manner such that it rotates with the cam shaft, but is free to slide axially of the cam shaft. As the engine speed increases, the flyweights will pivot outwardly by centrifugal force causing the fingers on the flyweights to move the spool axially of the shaft.

Engaged with the opposite end of the spool is a fork which straddles the cam shaft and the fork is secured to a rod or shaft which, in turn, is operably connected to the engine throttle. A biasing mechanism, such as a torsion spring, is associated with the rod and urges the fork into engagement with the spool.

As the engine speed increases due to a decrease in load, the flyweights will pivot outwardly under centrifugal force, overcoming the spring biasing force and moving the spool axially to pivot the fork about the axis of the rod and reduce the engine speed. Conversely, as the speed of the engine decreases, the flyweights will pivot inwardly and the spring biasing force will pivot the fork and urge the spool into engagement with the fingers of the flyweights to open the butterfly valve of the carburetor and increase the engine speed.

In accordance with the invention, the frictional forces in the system are reduced by providing the opposite end of the spool, against which the fork rides, with an irregular or undulating surface, which results in the continuous oscillation or "dancing" of the spool and flyweights during operation of the engine. In order to balance the forces on the two legs of the fork, it is preferred that the undulating surface have two cycles, i.e. two high spots and two low spots, which will result in two oscillations of the spool and flyweights for each revolution of the cam shaft.

This continuous oscillation or "dancing" has the effect of "averaging" the forces as friction is rapidly alternately added and substracted from centrifugal force. Under changing speed conditions, the flyweights will move radially relative to the spool with a much smaller speed change to provide more precise speed control and eliminate hunting, as occurs in prior systems.

Other objects and advantages will appear in the course of the following description.

Description of the Drawings

The drawings illustrate the best mode presently contemplated of carrying out the invention.

In the drawings.

DESCRIPTION OF THE ILLUSTRATED EMBODIMENT

Figure 1:
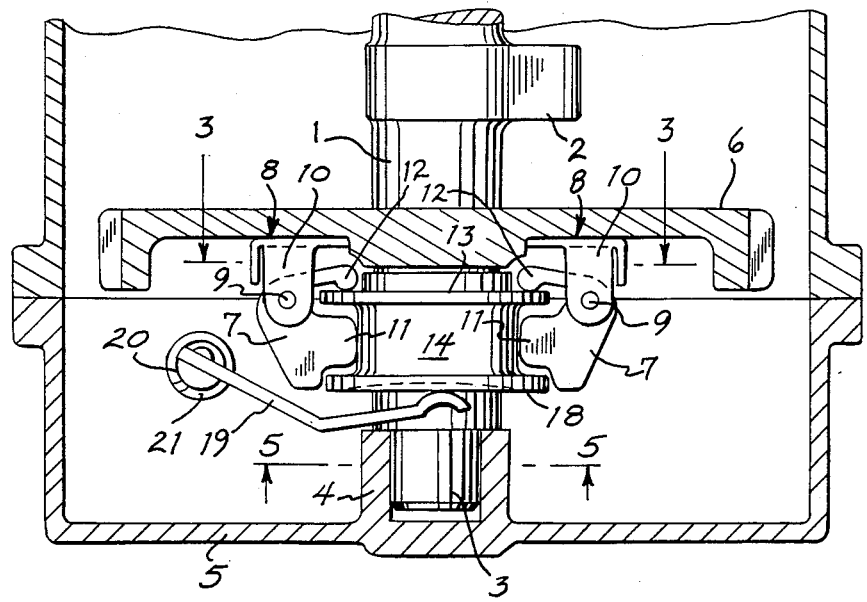
FIG. 1 is a longitudinal section of the speed governing system of the invention, as associated with the cam shaft of an engine and showing the flyweights in the rest position.
Figure 2:
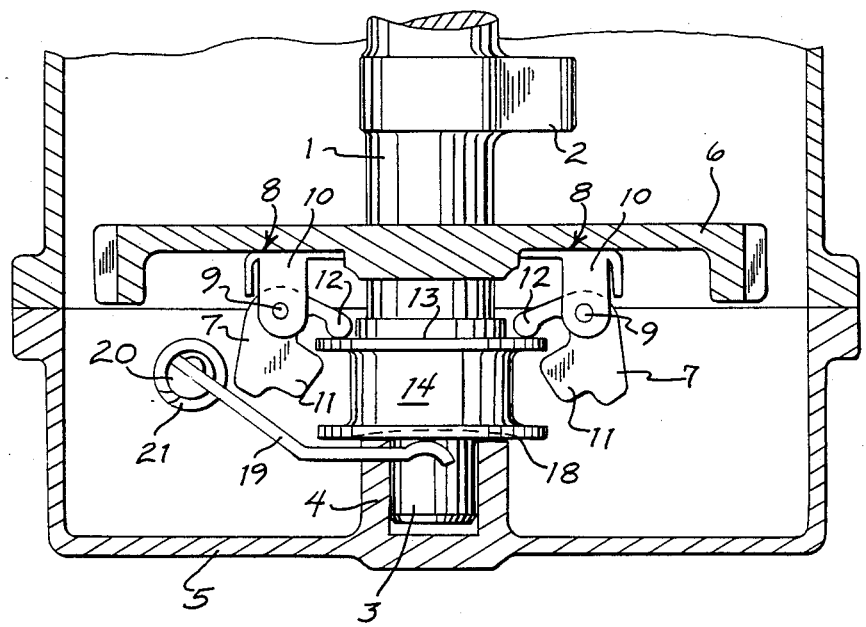
FIG. 2 is a view similar to FIG. 1 showing the flyweights and spool in a load position.
Figure 3:
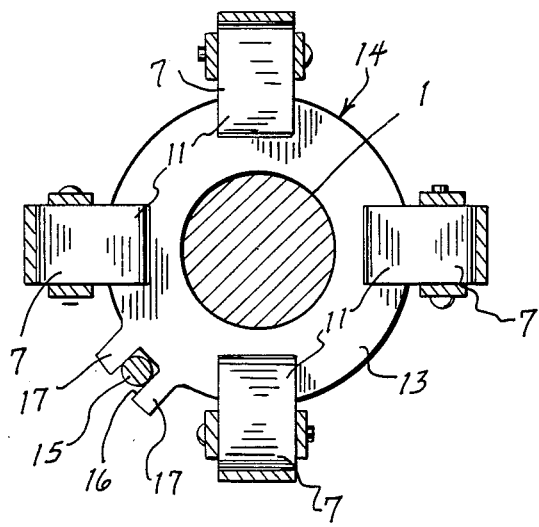
FIG. 3 is a section taken along line 3—3 of FIG. 1.
Figure 4:
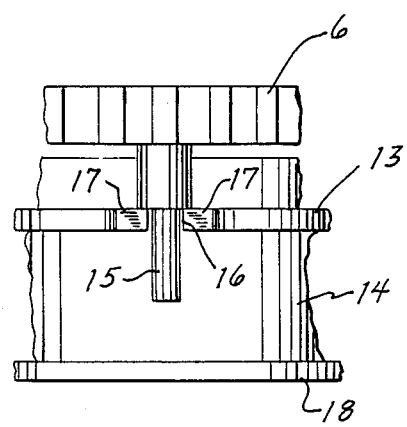
FIG. 4 is an enlarged fragmentary section showing the connection of the cam gear to the spool.

FIG. 1 shows a portion of a small industrial or commercial type internal combustion engine that can be used for driving a generator, a pump, or the like.

The engine includes a cam shaft 1 which carries a plurality of cams 2, only one of which is shown in the drawings. The end 3 of the cam shaft 1 is journalled within a bushing 4 in the crankcase end 5 of the engine.

A cam gear 6 is secured to cam shaft 1 and is driven by a drive gear, not shown, mounted on the crankshaft. A plurality of flyweights 7 are pivotally connected to a surface of gear 6 through brackets 8.

Figure 5:
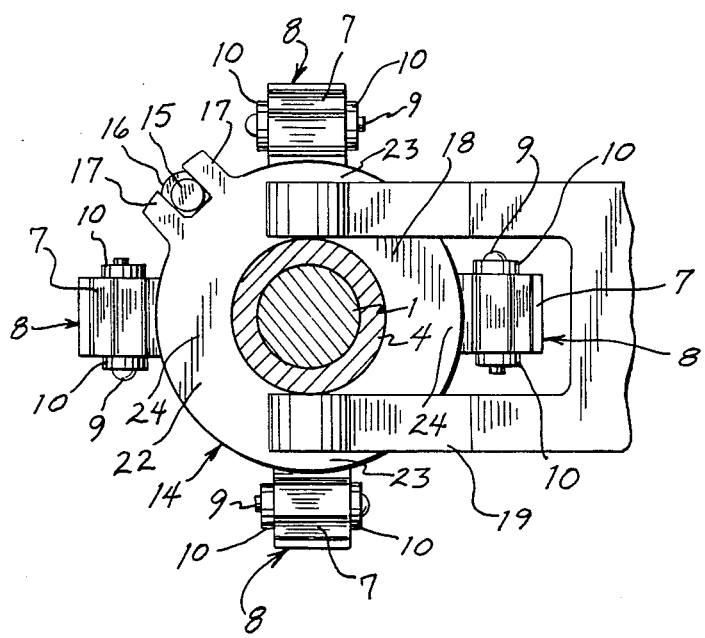
FIG. 5 is a section taken along line 5—5 of FIG. 1.

As shown in FIG. 5, there are four flyweights 7, which are spaced around the cam shaft, and each flyweight is connected by a pin 9 to the parallel ears or flanges 10 of the respective brackets 8.

Each flyweight includes a weighted end 11, and a finger or abutment 12, which is located on the opposite side of the pivot axis from end 11 and is disposed in engagement with a flanged surface 13 of a spool 14.

Spool 14 is mounted coaxially of cam shaft 1 in a manner such that the spool rotates with the cam shaft, but is free to slide axially relative to the cam shaft. In this regard, a pin 15 is secured to gear 6 and extends within a notch 16 defined by a pair of flanges 17 in the periphery of the spool. The pin and notch arrangement permits the spool to rotate with the cam shaft, yet permits axial movement of the spool relative to the shaft.

Engaged with the opposite end 18 of spool 14 is a fork 19. As best shown in FIG. 5, fork 19 straddles cam shaft 1 and does not rotate with the cam shaft.

The opposite or outer end of fork 19 is secured to rod 20, which is journalled for rotation within the wall of the crankcase 5. A biasing mechanism is employed to bias fork 19 into engagement with end 18 of spool 14. As illustrated, the biasing mechanism may take the form of a torsion spring 21 which surrounds rod 20. One end of the torsion spring is disposed within a hole in the rod, while the opposite end of the torsion spring engages an abutment, not shown, on the crankcase 5. With this construction, the force of the torsion spring will urge fork 19 into engagement with end 18.

With this arrangement, both the flyweights 7 and spool 14 rotate with cam shaft 1, so that there is no relative rotation between these elements. However, under changing speed conditions, the flyweights will pivot in or out in a radial direction, causing the fingers 12 of the flyweights to move relative to the spool end 13 and relative motion to occur between the flyweights, their pivots, and flanges 10.

To minimize the frictional forces occurring during this relative radial movement, a mechanism is utilized which causes the spool 14 and flyweights 7 to continually "dance" or oscillate during rotation of the cam shaft. In this regard, the end 18 of spool 14 is provided with an annular cam surface 22 which surrounds shaft 1. In order to balance the force on the two legs of fork 19, it is preferred that the cam surface have two cycles, i.e. two ridges or high spots 23, and two valleys or low spots 24. The axial depth or height of the cam, from the top of ridges 23 to the bottom of valleys 24, is a two cycle cosine function. In practice it has been found that the axial depth of the cam is in the neighborhood of about 0.002 to 0.007 inch and preferably about 0.004 inch.

During operation of the engine and rotation of cam shaft 1, fork 19 will ride on cam surface 22 to continually oscillate spool 14 in an axial direction and the flyweights 7, which are in contact with spool end 13, will continuously oscillate in a radial direction relative to the spool, so that the frictional forces though still present, are averaged out over a short time cycle. The magnitude of the radial oscillation is maintained such that it is sufficient to barely reverse the friction and no more. In practice the base of the spool moves a total of about 0.004 inch during oscillation. As friction is substantially averaged out, more precise speed control is obtained and "hunting" is virtually eliminated.

Various modes of carrying out the invention are contemplated as being within the scope of the following claims particularly pointing out and distinctly claiming the subject matter which is regarded as the invention.

I claim:

1. A speed governing apparatus for an engine, comprising rotatable shaft means, an annular member mounted on said shaft means to rotate therewith, said annular member being movable axially relative to said shaft means, flyweight means connected to said shaft means and disposed to be moved by centrifugal force between a first inner position and a second outer position, said flyweight means having a section engaged with a first surface of said annular member, said section being constructed and arranged to move the annular member axially in a first direction as said flyweight means moves from said first position to said second position, non-rotatable means engaged with a second surface of said annular member and operably connected to a speed control mechanism for said engine, said non-rotatable means being constructed and arranged so that axial movement of said annular member by said flyweight means will move said non-rotatable means to vary the speed of said engine, and means operably connected to said annular member for continuously oscillating said annular member in an axial direction and correspondingly oscillating said flyweight means in a radial direction relative to said annular member.

2. The apparatus of claim 1, and including biasing means for biasing said non-rotatable means into engagement with said second surface of said annular member, said biasing means acting to urge said annular member in a second axial direction opposite said first direction.

3. The apparatus of claim 2, wherein said oscillating means comprises undulations on said second surface.

4. The apparatus of claim 3, wherein said undulations comprise at least one radially extending ridge and valley.

5. A speed governing apparatus for an engine, comprising rotatable shaft means, an annular member mounted on said shaft means to rotate therewith, said annular member being movable axially relative to said shaft means, flyweight means connected to said shaft means and disposed to be moved by centrifugal force between a first inner position and a second outer position, said flyweight means having a section engaged with a first surface of said annular member, said section being constructed and arranged to move the annular member axially in a first direction as said flyweight means moves from said first position to said second position, non-rotatable means engaged with a second surface of said annular member and operably connected to a speed control mechanism for said engine, and non-rotatable means being constructed and arranged so that axial movement of said annular member by said flyweight means will move said non-rotatable means to vary the speed of said engine, biasing means for biasing said non-rotatable means into engagement with a second surface of said annular member, said biasing means acting to move said annular member in a second direction opposite said first direction, and oscillating means operably connected to one of said surfaces of said annular member for providing continuous oscillation of said annular member in an axial direction and corresponding continuous oscillation of said flyweight means in a radial direction relative to said annular member to reduce the hysteretical effect of the friction therebetween.

6. The apparatus of claim 5, wherein said second surface extends transversely of the axis of said annular member.

7. The apparatus of claim 5, wherein said non-rotatable means comprises a fork straddling said shaft means and engaged with said second surface.

8. The apparatus of claim 5, wherein said oscillating means comprises surface deviations on the second surface of said.

9. The apparatus of claim 8, wherein said second surface is disposed concentrically of the axis of said annular member and said surface deviations comprise with a pair of ridges and a pair of valleys.

10. The apparatus of claim 8, wherein said surface deviation comprises alternately ridges and valleys having an axial depth of 0.002 to 0.007 inch.

11. The apparatus of claim 10, wherein said ridges are disposed diametrically opposite of each other and said valleys are opposed diametrically opposite each other.

12. A speed governing apparatus for an internal combustion engine, comprising rotatable shaft means, an annular member mounted on said shaft means to rotate therewith, said annular member being movable axially relative to said shaft means, flyweight means connected to said shaft means and disposed to be moved by centrifugal force between a first inner position and a second outer position, said flyweight means being constructed and arranged to move the annular member axially in a first direction as said flyweight means moves from said first position to said second position, and connecting means engaged with said annular member and operably connected to a speed control mechanism for said engine, said connecting means being constructed and arranged so that axial movement of said annular member by said flyweight means will move said connecting means to vary the speed of said engine, and means responsive to rotation of said shaft means for continuously oscillating said annular member in an axial direction and correspondingly continuously oscillating said flyweight means in a radial direction relative to said annular member.

* * * * *

UNITED STATES PATENT AND TRADEMARK OFFICE
CERTIFICATE OF CORRECTION

PATENT NO. : 4,895,119

DATED : January 23, 1990

INVENTOR(S) : JOSEPH R. HARKNESS

It is certified that error appears in the above-identified patent and that said Letters Patent is hereby corrected as shown below:

COL. 4, Line 68, CLAIM 8, After "said" and before "." insert --annular member---

Signed and Sealed this

Twentieth Day of August, 1991

*Attest:*

HARRY F. MANBECK, JR.

*Attesting Officer*   Commissioner of Patents and Trademarks